United States Patent [19]

Kawai et al.

[11] Patent Number: 4,813,529

[45] Date of Patent: Mar. 21, 1989

[54] CONVEYOR SYSTEM FOR USE IN AUTOMOBILE ASSEMBLY LINE

[75] Inventors: Shinichi Kawai, Tokyo; Eiji Fukazawa, Kawagoe; Hiroshi Miyashita, Sayama; Yoshio Shiiba, Saitama, all of Japan

[73] Assignee: Honda Giken Kogyo Kabushiki Kaisha, Tokyo, Japan

[21] Appl. No.: 648,222

[22] Filed: Sep. 7, 1984

[30] Foreign Application Priority Data

Sep. 8, 1983 [JP] Japan .................................. 58-165806
Jun. 14, 1984 [JP] Japan .................................. 59-122593

[51] Int. Cl.⁴ .............................................. B65G 25/00
[52] U.S. Cl. ................................ 198/468.6; 198/468.2; 414/226; 414/589; 29/824
[58] Field of Search ................ 198/488, 473, 339, 345, 198/339.1, 476.1, 468.1, 468.2, 468.6; 29/430, 709, 711, 822-824, 791; 104/96, 172 S; 414/589, 226; 901/7

[56] References Cited

U.S. PATENT DOCUMENTS

| | | | |
|---|---|---|---|
| 3,048,126 | 8/1962 | Salapatas | 104/96 |
| 3,404,936 | 10/1968 | Kavieff | 104/96 |
| 4,643,630 | 2/1987 | Shiiba et al. | 414/589 |

FOREIGN PATENT DOCUMENTS

| | | | |
|---|---|---|---|
| 3150476 | 6/1983 | Fed. Rep. of Germany | 29/824 |
| 57-1104 | 1/1982 | Japan | 198/345 |

Primary Examiner—Joseph E. Valenza
Attorney, Agent, or Firm—Armstrong, Nikaido Marmelstein & Kubovcik

[57] ABSTRACT

A conveyor system for use in an automobile assembly line having a body-carrying tact conveyor arranged in an endless form past an engine mounting position, and switchable between a running mode and a stopping mode, a body-carrying continuous conveyor arranged in an endless form and having an inlet section and an outlet section which are arranged on the extensions of the inlet section and the outlet section of the tact engine mounting position, a pair of feeders for delivery an automobile body between the inlet sections of both conveyors and between the outlet sections of both conveyors, and engine transferring conveyor arranged in an endless form past a delivery position near the engine position and stoppable at the body delivery position, and an engine shifting conveyor having an engine shifting jig and extending between the body delivery position and the engine mounting position and being reciprocable at a comparatively high speed.

2 Claims, 8 Drawing Sheets

CONVEYOR SYSTEM FOR USE IN AUTOMOBILE ASSEMBLY LINE

BACKGROUND OF THE INVENTION

1. Field of the Invention

The present invention relates to a conveyor system for use in automobile assembly lines, particularly, in an engine mounting step for mounting an engine on an automobile body.

2. Description of the Prior Art

Referring to FIG. 9, in a conventional conveyor system of the kind described, an assembled engine E is hung from a hanger H and is conveyed to a slat conveyor 81 by means of an overhead conveyor 80, and is shifted onto a carrier jig 82 provided on the slat conveyor 81. Then, while the engine E is being conveyed by the slat conveyor 81, necessary accessories are attached to the engine E. On the other hand, the body B of an automobile after having been equipped is transferred by means of an overhead conveyor 83. While the overhead conveyor 83 runs in synchronism with the slat conveyor 81, the engine E is lifted by the carrier jig 82 and is mounted on the automobile body B. Subsequently, fittings such as wheels and other associated parts are attached to the automobile body B while the overhead conveyor 83 is moving, thus completing the assembly. The assembled automobile is then shifted to the slat conveyor 84 running in synchronism with the overhead conveyor 83. Then, interior parts and accessories are attached to the thus assembled automobile, and gas and oil are supplied, thus finishing the production of the automobile.

This known automobile assembly system has the following disadvantages (a) to (e).

(a) The conveyors 80, 81, 83 and 84 have to operate in perfect synchronism. Attaining the required synchronism of operation of these conveyors involves fairly troublesome work.

(b) The line speed is limited by the time required for the mounting of the engine on the automobile body, so that it is difficult to increase the production rate.

(c) The slat conveyor has to have a considerable length because the attaching of the engine E to the automobile body B is conducted while the engine mounting slat conveyor 81 runs in a side-by-side relation to the body transferring overhead conveyor 83. The slat conveyor 81 has an endless form so that it is required to have a multiplicity of shifting jigs 82. In consequence, the installation space is increased undesirably.

(d) Each shifting jig 82 must have a driving connection to a power source, in order that these jigs 82 can be power driven. Consequently, an impractically large number of driving connections are required inconveniently.

(e) During mounting of the engine E on the automobile body B, the operator is forced to walk along the slat conveyor 81 at the same speed as the running of the slat conveyor 81 and the overhead conveyor 83, resulting in an impractically large use of labor.

SUMMARY OF THE INVENTION

Accordingly, an object of the invention is to provide a conveyor system for use in an automobile assembly line, improved to overcome the above-described problems of the prior art.

Namely, the invention aims at providing a conveyor system improved so as to eliminate the necessity for all synchronizing adjustments but which permits a part of the conveyor system to operate at a higher speed than in the conventional system, thereby attaining a higher productivity and reducing the installation area. The invention aims also at eliminating necessity for driving connection of shifting jigs to power source, while allowing the mounting of the engine on the automobile body in a stationary state.

To these ends, according to the invention, there is provided a conveyor system for use in an automobile assembly line comprising: a body-carrying tact conveyor arranged in an endless form past an engine mounting position, said tact conveyor being switchable between a running mode and a stopping mode; a body-carrying continuous conveyor arranged in an endless form and having an inlet section and an outlet section which are arranged on the extensions of an inlet section and an outlet section of said tact conveyor arranged at inlet and outlet sides of said engine mounting position; a pair of feeders for delivery of an automobile body between the inlet sections of both conveyors and between the outlet sections of both conveyors; an engine transferring conveyor arranged in an endless form past a delivery position near said mounting position and capable of making a stop at said delivery position; and an engine shifting conveyor provided with an engine shifting jig and arranged to extend between said delivery position and said mounting position and capable of making a reciprocating movement at a comparatively high speed.

This conveyor system offers the following advantages:

(a) Only one synchronizing adjustment is required. Namely, synchronism of operation is required only between the continuous body-carrying conveyor and a body-forwarding conveyor connected to the continuous body-carrying conveyor. Consequently, the synchronizing adjustment is facilitated advantageously.

(b) It is possible to reduce the running speed of the engine shifting conveyor. In consequence, the production rate can be increased even though the time length required in mounting the engine is unchanged.

(c) The engine shifting conveyor has to be laid only over a small length between the engine shifting position and the engine mounting position. In addition, the conveyor system of this embodiment requires only one engine shifting jig.

(d) It is not necessary to supply the driving power to the engine shifting jig.

(e) Since the mounting of the engine on the automobile body is conducted while the automobile body is in the stationary state, use of labor can be reduced advantageously.

The above and other objects, features and advantages of the invention will become clear from the following description of the preferred embodiments when the same is read in conjunction with the accompanying drawings.

DESCRIPTION OF THE PREFERRED EMBODIMENT

A preferred embodiment of the invention will be described hereinunder with reference to the accompanying drawings.

Figure 1:
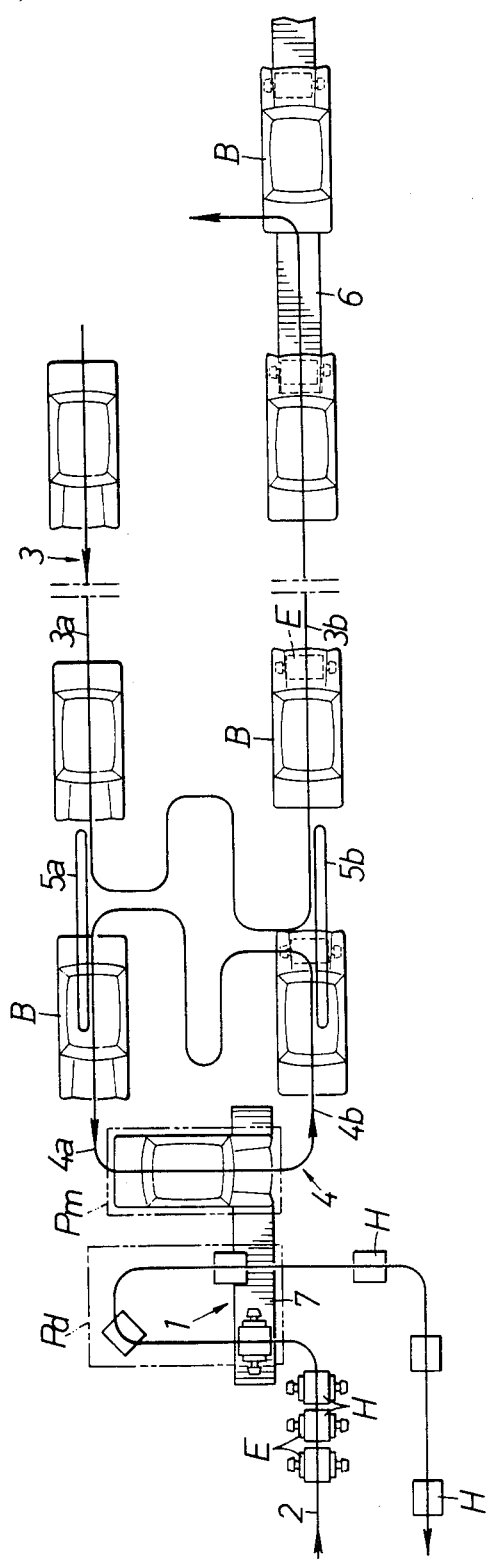
FIG. 1 is a general view of an embodiment of a conveyor system in accordance with the invention, in a step of mounting an engine on an automobile body.

Referring first to FIG. 1, the automobile assembly process includes an engine mounting step in which an assembled engine E is mounted on an equipped automobile body B. This engine mounting step employs various conveyors: namely, an engine transferring conveyor 2 for transferring the engine E, a body-carrying continuous conveyor 3, a body-carrying tact conveyor 4, a pair of feeders 5a,5b for delivering the body B from the conveyor 3 to the conveyor 4, a body-forwarding conveyor 6 for forwarding the body B with the engine mounted thereon, and an engine shifting device 1.

The body-carrying tact conveyor 4 is an overhead conveyor arranged in an endless manner past a mounting position Pm. This conveyor can operate in either one of two modes: namely, a transfer mode in which the automobile body B is transferred and a stationary mode in which the same is held stationary. More specifically, the running of the body-carrying tact conveyor 4 is stopped when it has brought the automobile body B to the mounting position Pm and is restarted after the completion of mounting of the engine.

On the other hand, the body-carrying continuous conveyor 3 is an endless conveyor having an inlet section 3a provided on the extension of an inlet section 4a of the body-carrying tact conveyor 4 and an outlet section 3b disposed on the extension of an outlet section 4b of the body-carrying tact conveyor 4.

The feeders 5a and 5b are disposed, respectively, between the inlet sections 3a and 4a of both conveyors 3 and 4 and between the outlet sections 3b and 4b of these conveyors 3 and 4.

A forwarding conveyor 6 is a slat conveyor partially lapping the outlet section 3b of the body-carrying continuous conveyor 3 and adapted to be driven in synchronism with the conveyor 3.

A delivery position Pd is set up in the vicinity of the mounting position Pm. The engine transferring conveyor 2 is arranged in an endless form past the delivery position Pd. The engine transferring conveyor 2 is an overhead power-and-free type conveyor, and is adapted to be stopped when a hanger H for hanging the engine E has reached the delivery position Pd so as to permit the delivery of the engine E from the hanger H.

Figure 2:
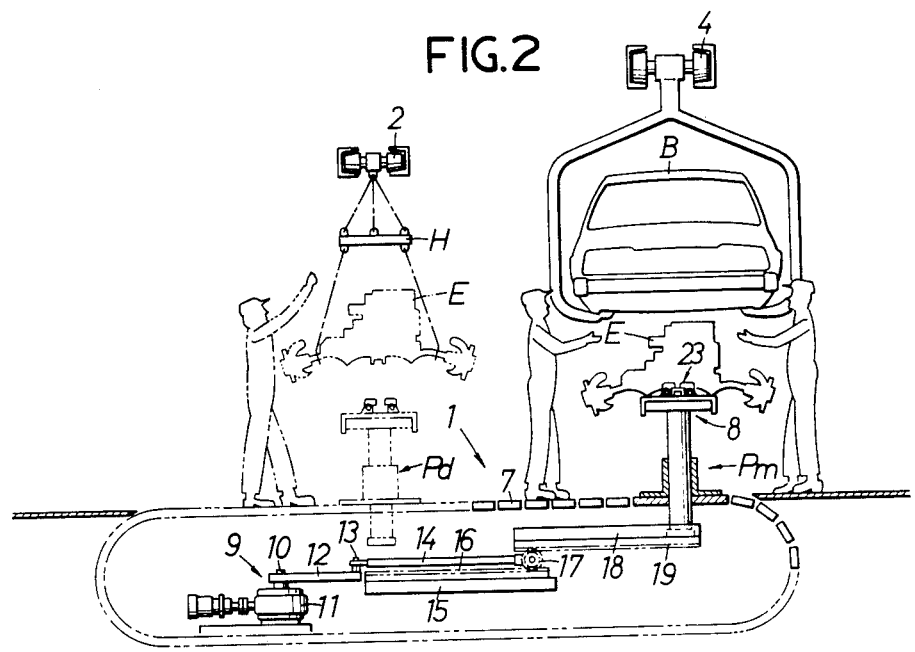
FIG. 2 is a simplified vertical sectional view of an engine shifting device incorporated in the conveyor system as shown in FIG. 1.

Referring now to FIG. 2, the engine shifting device 1 is extended between the delivery position Pd and the mounting position Pm. The engine E which has been transferred by the engine transferring conveyor 2 is shifted onto the engine shifting device 1 at the delivery position Pd and is moved to the mounting position Pm where the engine E is transferred from the engine shifting device 1 to the body B which is being conveyed by the body-carrying tack conveyor 4.

The engine shifting device 1 has an engine shifting conveyor 7 extended between the delivery position Pd and the mounting position Pm, and a shifting jig 8 disposed at an intermediate portion of the engine shifting conveyor 7. The engine shifting conveyor 7 is an endless bellows conveyor which is adapted to be driven reciprocatingly by a driving means 9.

The driving means 9 has a driving section 11 equipped with a motor having a vertical driving shaft 10, reduction gear and so forth, a rotary arm 12 having one end connected to the driving shaft 10 and extending horizontally therefrom, a connecting rod 14 extending horizontally and connected at its one end to the other end of the rotary arm 12 through a pin 13 parallel to the driving shaft 10, a lower support 15 disposed below the connecting rod 14 so as to extend horizontally along the line connecting the delivery position Pd and the mounting position Pm, a lower rack 16 fixed to the lower support 15, a gear 17 carried by the other end of the connecting rod 14 and meshing with the lower rack 16, an upper support 18 disposed and fixed in parallel with the lower rack 16, and an upper rack 19 mounted on the upper support 18 for movement along the length thereof and meshing with the gear 17 at the upper side of the latter.

In this driving means 9, the driving shaft 10 of the driving section 11 can reciprocatingly rotate through an angle of 180°. In consequence, the gear 17 reciprocatingly rolls on the lower rack 16 through the action of the rotary arm 12 and the connecting rod 14. As a result of the rolling of the gear 17, the upper rack 19 runs reciprocatingly at a speed greater than that of the movement of the gear 17. Consequently, the engine shifting conveyor 7 and the shifting jig 8 are moved reciprocatingly.

Figure 3:
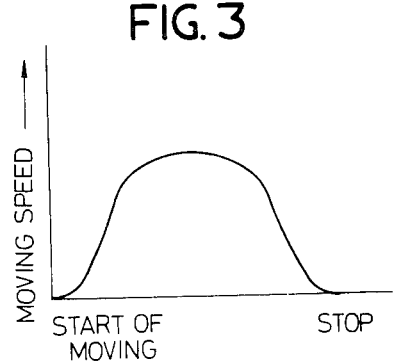
FIG. 3 is a chart showing the speed characteristics of a shifting conveyor.

The moving speed of the engine shifting conveyor 7 and the shifting jig 8 are so determined that the conveyor 7 and the jig 8 move at a comparatively low speed immediately after the start up of moving and immediately before the stopping and at a comparatively high speed at the midway of their strokes, as will be seen from FIG. 3. With such an arrangement, it is possible to prevent accidental dropping of the engine E from the shifting jig 8, and to prevent any accidental falling of a worker on the engine shifting conveyor 7 at the time of starting and stopping of this conveyor 7. The mean speed of the engine shifting conveyor 7 is selected to be higher than the body-carrying continuous conveyor 3 and the forwarding conveyor 6. The speeds of the conveyors 2,3,4,6 and 7 are determined at predetermined ratios to one another.

Figure 4:
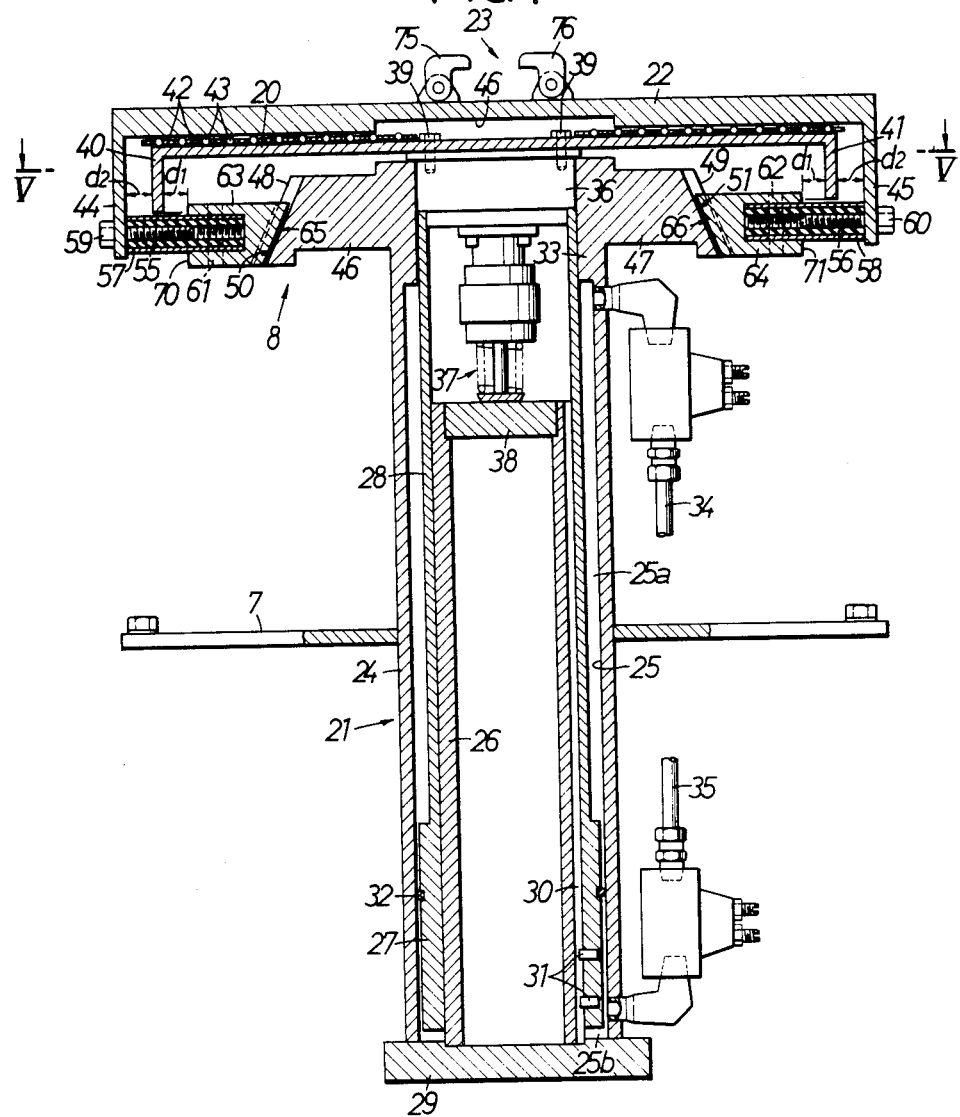
FIG. 4 is an enlarged vertical sectional view of a shifting jig.

Referring now to FIG. 4, the shifting jig 8 includes a lifting means 21 carried by the shifting conveyor 7 and having a slide plate 20, a mounting plate 22 for carrying the engine E and carried by the slide plate 20 for movement in all horizontal directions within a limited area on the slide plate 20 when the lifting means 21 has operated to lift the slide plate 20, and a locking means 23 provided on the mounting plate 22 and engageable with the engine E.

The lifting means 21 includes a cylinder 24 opened at its upper end and extending vertically, a cylinder 26 fixed to the lower end of the cylinder 24 and received by the latter to cooperate with the same in defining therebetween an annular cylinder chamber 25, an annular piston 27 slidably received in the annular cylinder chamber 25 and a cylindrical rod 28 formed integrally with the piston 27 and projecting from the upper end of the cylinder 24.

The cylinder 24 is fixed at its axially midway portion to the shifting conveyor 7. The lower end of the cylinder 24 is closed by an end plate 29. The cylinder 26 is fixed to the same end plate 29 and protrudes upright therefrom to an intermediate height of the cylinder 24. A key-way 30 is formed in the outer surface of the cylinder 26 so as to extend over the entire length thereof, while a pair of keys 31 are formed on the piston 27 such as to fit in the key-way thereby preventing rotation of the piston 27 around the cylinder 26. Consequently, the piston 27 and the rod 28 are prevented from rotating around the axis during vertical stroking of the piston 27. An "O" ring 32 fits on the outer surface of the piston 27 so as to make a sliding contact with the inner surface of the cylinder 24 to produce a sealing effect.

The cylindrical rod 28 has a diameter smaller than that of the piston 27. In order to make a sliding contact with the outer surface of the rod 28, the cylinder 24 is provided at its upper end with an inward flange 33 extending radially inwardly from the upper end of the cylinder 24, thus closing the upper end of the cylinder chamber 25. The piston 27 divides the cylinder chamber 25 into two parts: namely, an upper cylinder chamber 25a communicating with a downward driving pneumatic pipe 34 connected to an upper portion of the cylinder 24 and a lower cylinder chamber 25b communicating with an upwardly driving pneumatic pipe 35 connected to a lower portion of the cylinder 24.

The upper end of the rod 28 is closed by a closure member 36. An impact damping means 37 is provided on the portion of the lower face of the closure member 36 within the cylinder 24. The impact damping means 37 is adapted to contact with the end plate 38 fixed to the upper end of the cylinder 26, thereby to damp any impact which may be produced as a result of downward stroking of the piston 27 and the rod 28.

Figure 5:
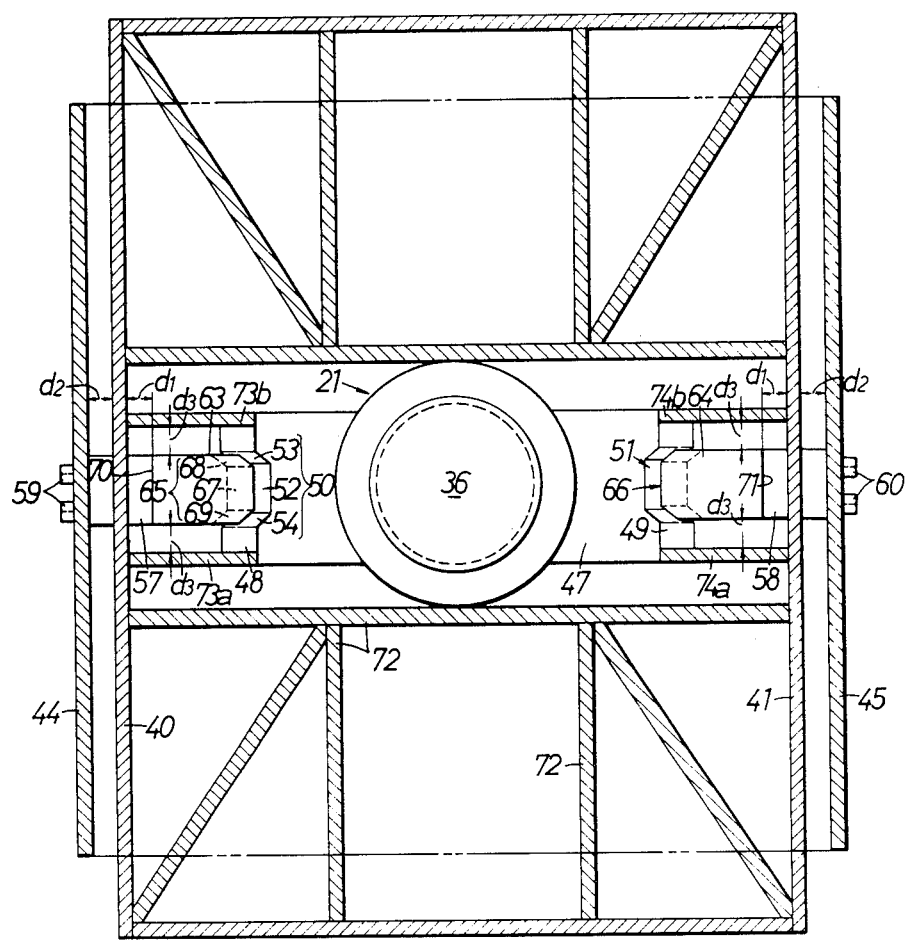
FIG. 5 is a sectional view taken along the line V—V of FIG. 4.
Figure 6:
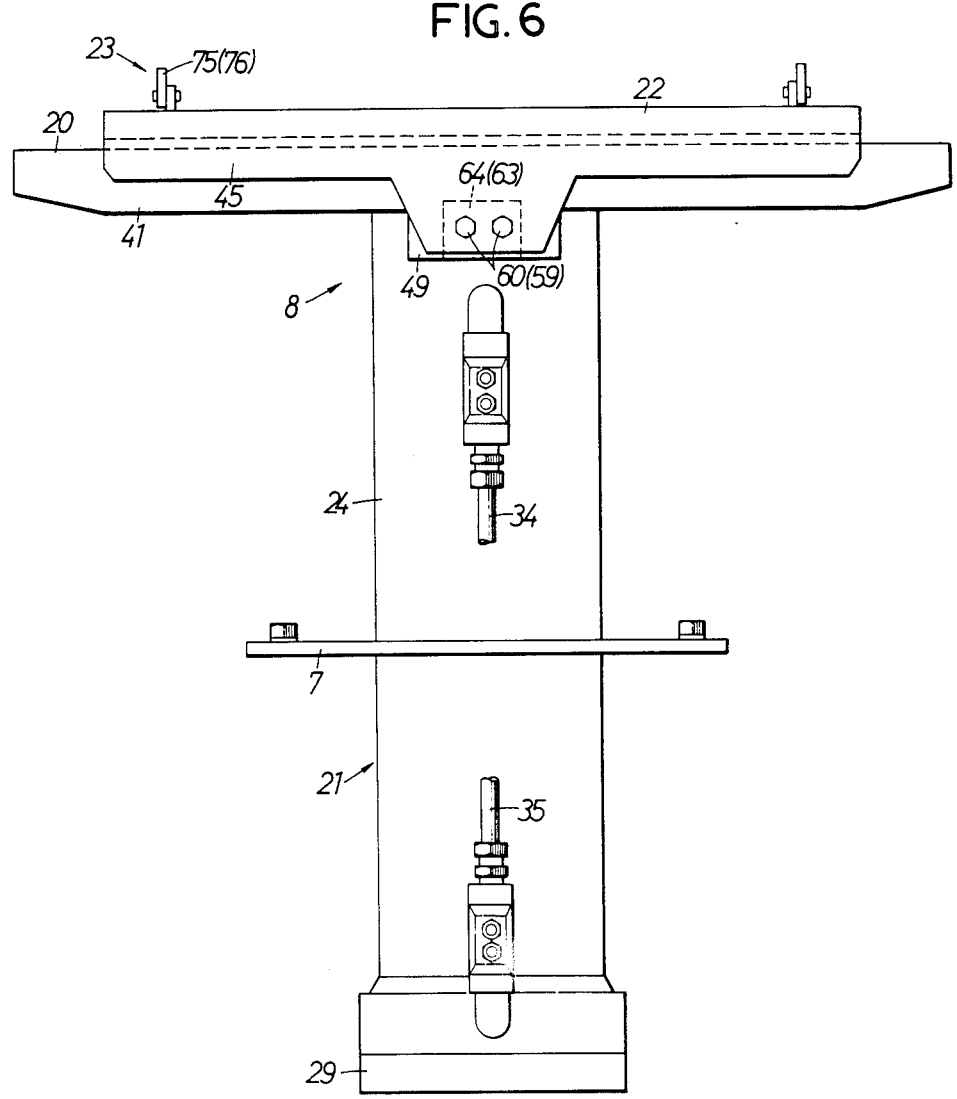
FIG. 6 is a right-side elevational view of the shifting jig as shown in FIG. 4.

Referring now to FIGS. 5 and 6, a rectangular slide plate 20 is fixed to the upper surface of the closure member 36 by means of bolts 39 so as to extend horizontally. The slide plate 20 is disposed such that, for example, the longer sides thereof extend in the direction perpendicular to the plane of FIG. 4, i.e., vertical direction as viewed in FIG. 5 and lateral direction as viwed in FIG. 6. Downwardly extending limiting flanges 40 and 41 are integrally attached to both widthwise ends (left and right ends as viewed in FIG. 4) of the slide plate 20.

A multiplicity of steel balls 43 held by a retainer 42 are placed on the portion of the slide plate 20 except the central region of the latter. These steel balls 43 carry a square mounting plate 22 for mounting the engine E. The length of each side of the mounting plate 22 is greater than the width of the slide plate 20. The mounting plate 22 is provided with suporting flanges 44,45 extending along the limiting flanges 40,41 on the slide plate 20 and projecting downwardly beyond the lower end of the limiting flanges 40,41. A recess 46 for clearing the bolts 39 is formed in the central portion of the lower face of the mounting plate 22.

Figure 7:
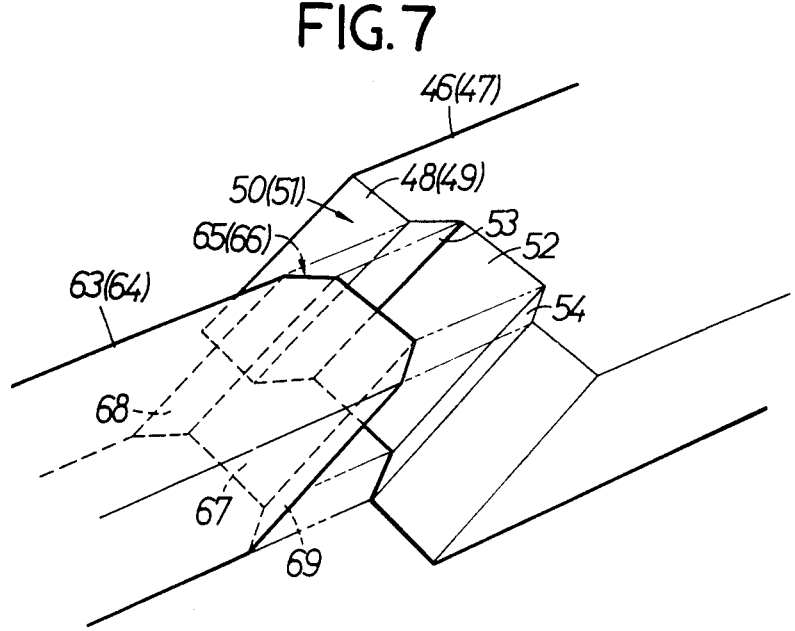
FIG. 7 is an enlarged perspective view of a cam groove and a cam.

Referring also to FIG. 7, the cylinder 24 is integrally formed at its upper end with a pair of outer flanges 46,47 extending outwardly along the width of the slide plate 20. These outer flanges 46,47 have outer end surfaces 48,49 which are tapered outwardly and downwardly. In addition, these tapered outer end surfaces 48 and 49 are provided in their central portions with cam grooves 50 and 51, respectively. Each of the cam grooves 50 and 51 is provided with a bottom surface 52 parallel with the outer end surfaces 48 or 49 and a pair of side walls 53 and 54 which extend from both edges of the bottom surface 52 and diverge outwardly.

Cam holders 57,58 received by buffer members 55,56 made of an elastic material such as urethane rubber fit on the inner surfaces of the supporting flanges 44,45 of the mounting plate 22, by means of bolts 59,60 which are screwed from the outside of the supporting flanges 44,45. Cam members 63,64 are attached to the ends of the cam holders 57,58 through pins 61,62. At the same time, cams 65,66 corresponding to the cam grooves 50,51 are formed in the ends of the cam members 63,64. Namely, the cams 65,66 have end surfaces 67 facing the bottom surfaces 52 of the cam grooves 50,51 and both side walls 68,69 facing the side walls 53,54 of the cam grooves 50,51, so that the cams 65,66 are engageable with the cam grooves 50,51, respectively.

When the cams 65,66 fit in the cam grooves 50 and 51, i.e., when the piston 27 and the rod 28 are in the lower ends of their strokes, a clearance $d_1$ is left between the end surfaces 70,71 of the cam members 63,64 opposite to the cams 65,66 and both limiting flanges 40,41 of the slide plate 20. In this state, a clearance $d_2$ equal to or slightly greater than the clearance $d_1$ is left between the limiting flanges 40,41 and the supporting flanges 44,45 of the mounting plate 22.

Referring again to FIG. 5, a plurality of reinforcement plates 72 are fixed to the lower side of the slide plate 20. In addition, two pairs of limiting members 73a,73b; 74a,74b disposed at both sides of respective cam members 63,64 are fixed to the lower face of the slide plate 20. When the mounting plate 22 is located at the central position, an equal clearance $d_3$ is left between the limiting members 73a,73b; 74a,74 b and both cam members 63,64.

The clearance $d_3$ is selected to be greater than the aforementioned clearance $d_1$, i.e., the condition of $d_3 > d_1$ is met. Namely, the portion of the engine transferring conveyor 2 passing the delivery position Pd and the portion of the body-carrying tact conveyor 4 passing the mounting position Pm are held in parallel with each other and the engine shifting conveyor 7 runs reciprocatingly in the direction perpendicular to the conveyors 2 and 4. Therefore, the deviation of the engine E on the mounting plate 22 and the predetermined engine mounting portion of the body B at the mounting position Pm becomes greater in the direction of movement of the conveyors 2 and 4, i.e., in the longitudinal direction of the body B than in the direction of running of the engine mounting conveyor 7, i.e., the direction of breadth of the body B. This is the reason why the clearance $d_3$ for limiting the amount of movement of the mounting plate 22 along the length of the body B is selected to be greater than the clearance $d_1$ for limiting the amount of movement of the mounting plate 22 along the width of the body B.

The locking means 23 is constituted by a pair of engaging tabs 75 and 76 pivotally supported on the mounting plate 22. These engaging tabs 75,76 are rotatable between a locking position where they engage and lock the engine E on the mounting plate 22 and a releasing position where they unlock the engine E. Thus, the engine E is fixed to the mounting plate 22 by being engaged by the engaging tabs 75 and 76 so that the shifting jig 8 can run at a high speed.

The operation of the embodiment having the construction heretofore described is as follows.

The body B after being equipped is delivered from the inlet section 3a of the continuous conveyor 3 to the inlet section 4a of the body-carrying tact conveyor 4 through the feeder 5a. The body-carrying tact conveyor 4 is automatically stopped when the body B carried by this conveyor reaches the mounting position Pm.

Figure 8:
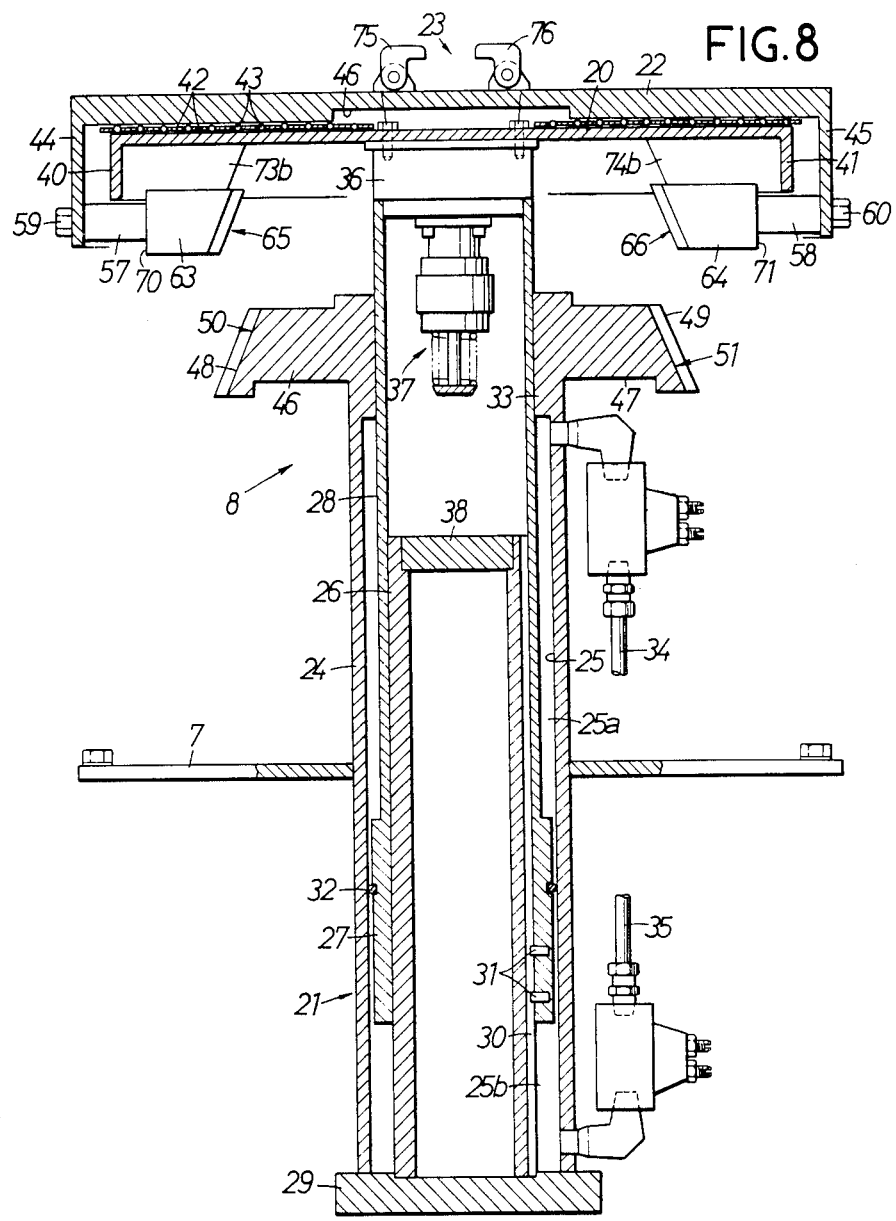
FIG. 8 is a vertical sectional view of the shifting jig shown in FIG. 4, with a mounting plate in the lifted position.
Figure 9:
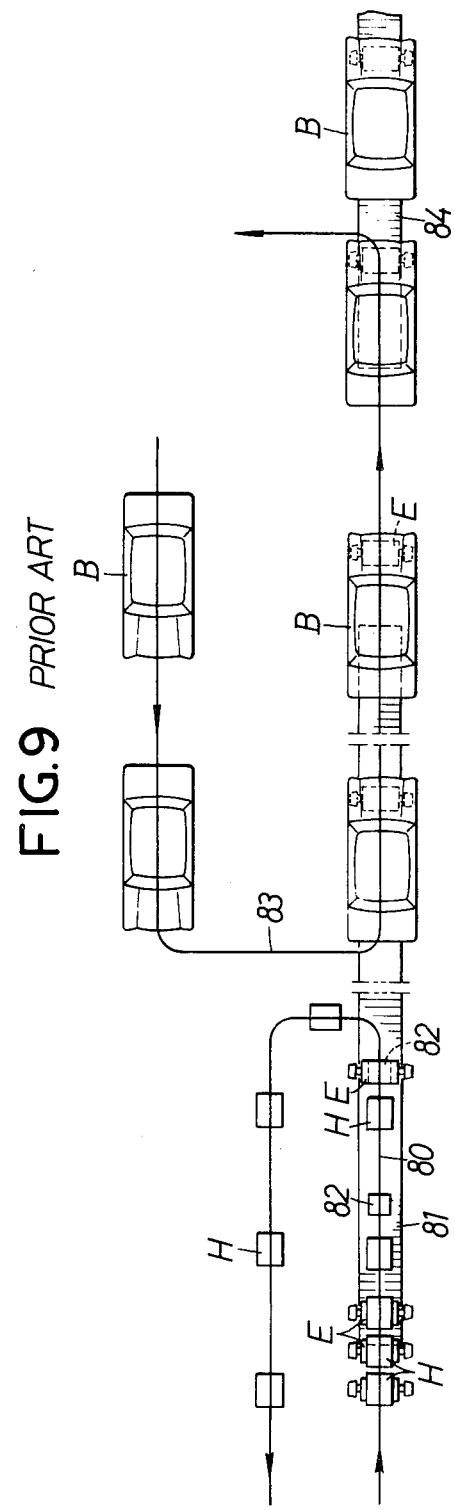
FIG. 9 shows the general arrangement of a conventionl conveyor system.

Meanwhile, the engine E is hung from a hanger H and brought to the delivery position Pd by the engine transferring conveyor 2. The conveyor 2 is stopped when the engine E has reached the delivery position Pd. Subsequently, the engine shifting conveyor 7 is operated to move the engine shifting jig 8 to the position just beneath the engine E stationed at the delivery position Pd. Assume here that the piston 27 and the rod 28 are positioned at their lower stroke ends and that pressurized air is supplied into the lower cylinder chamber 25b through the upwardly-driving pneumatic pipe 35. As a result, the piston 27 is moved upward as shown in FIG. 8. During this upward stroking of the piston 27, the rotation of the piston 27 around its axis is prevented by the cooperation between the keys 31 and the key-way 30. In consequence, the mounting plate 22 also is lifted to allow the transfer of the engine from the engine transferring conveyor 2 to the mounting plate 22. Then, after fixing the engine E onto the mounting plate 22 by the locking means 23, air is introduced from the downward-driving pneumatic pipe 34 into the upper cylinder chamber 25a, so that the piston 27 is lowered to move the mounting plate 22 downwardly to the starting position. Thereafter, the shifting conveyor 7 is driven to move the mounting plate 22 to the mounting position Pm. However, since the engine E is fixedly mounted on the mounting plate 22, the engine E is stably held even though the running speed of the engine shifting conveyor 7, i.e., the speed of the mounting plate 22, is increased. In this manner, it is possible to attain a high speed of movement of the engine E from the delivery position Pd to the mounting position Pm.

When the automobile body B to which the engine E is to be mounted is brought to a position above the mounting plate 22, compressed air is supplied to the lower cylinder chamber 25b through the upwardly-driving pneumatic pipe 35. As a result, the piston 27 is moved upwardly to raise the mounting plate 22 to a predetermined level convenient for the attaching of the engine E to the body B. Thereafter, the locking means 23 is operated to unlock the engine E to prepare for the mounting of the engine E on the body B. In some cases, it is necessary to slightly adjust the position of the engine E horizontally. Such an adjustment can easily be attained by manually moving the mounting plate 22 horizontally. Namely, the mounting plate 22 carried by the slide plate 20 through the intermediary of a multiplicity of steel balls 43 can be moved horizontally in all directions until the end surfaces 70,71 of the cam members 63,64 are stopped by the limiting flanges 40,41 and until the cam members 63,64 are contacted by the limiting members 73a,73b; 74a,74b, thereby permitting a delicate adjustment of position of the engine.

After mounting the engine E on the automobile body B, compressed air is supplied through the downward-driving pneumatic pipe 34 into the upper cylinder chamber 25a thereby to lower the piston 27.

As stated before, the cylinder 24 is provided at its upper end with cam grooves 50,51, while the cam members 63,64 integral with the mounting plate 22 are provided with cams 65,66 corresponding to these cam grooves. Therefore, even if the mounting plate 22 is offset from the center, the mounting plate 22 can move in such a way that the cams 65,66 fit in the cam grooves 50,51. When the piston 27 has come down to the lowermost end of the stroke, the mounting plate 22 is reset to the central position. By so doing, it is possible to always reset the mounting plate 22 at the central position, when the engine E is mounted on the mounting plate 22.

Referring now to the body-carrying tact conveyor 4, after the completion of mounting of the engine E on the body B, the conveyor 4 starts to move again so that the body B is transferred from the outlet section 4b of the body-carrying tact conveyor 4 to the outlet section 3b of the continuous conveyor 3 through the feeder 5b. Wheels and other fittings are attached to the body B, while the body B is being conveyed by the conveyor 3. Then, the body B is shifted to the forwarding conveyor 6 running in synchronism with the conveyor 3 and is forwarded by the conveyor 6.

The time length required for the engine mounting step in accordance with the invention is shown in the following Table 1 in comparison with that for the conventional system.

TABLE 1

|  | invention | prior art |
| --- | --- | --- |
| actual working time | 40 seconds | 40 seconds |
| loss time | 0 second | 5 second |
| returning walking time | 2 seconds | 8 seconds |
| preparation time | 4 seconds | 6 seconds |
| engine lowering | 1 second | 2 seconds |
| total | 47 seconds | 61 seconds |

As will be clearly seen from Table 1, the conveyor system of the invention affords a shorter working time. In Table 1, the "loss time" in the process employing the conveyor system of the invention is zero, while the "loss time" in the conventional process is 5 seconds. This is attributable to the fact that, while in the prior art the worker attaches the engine to the body while he is walking, the conveyor system of the invention permits the attaching of the engine to the body while the body is kept stationary. The shortening of the "preparation time" owes to the fact that the conveyor system of the invention eliminates the necessity for the driving connections of a plurality of mounting jigs to power source which are necessary in the prior art. The shortened "engine lowering" time owes to the fact that, while in the prior art the lowering of the engine has to be made between a pair of conveyors which run in synchronism with each other, the invention permits the lowering of the engine in the stationary state.

What is claimed is:

1. A conveyor system for use in an automobile assembly line comprising: a body-carrying tact conveyor arranged in an endless form and passing an engine mounting position, said tact conveyor having an inlet section and an outlet section and being switchable between a running mode and a stopping mode; a body-carrying main conveyor arranged in an endless form for running in a continuous mode and having a carry-in section and a carry-out section aligned, respectively, with said inlet section and said outlet section of said tact conveyor, said engine mounting position being between said inlet section and said outlet section of said tact conveyor; a pair of feeders for delivery an automobile body from the carry-in section of said main conveyor to the inlet section of said tact conveyor and from the outlet section of said tact conveyor to the carry-out section of said main conveyor; an engine transferring conveyor arranged in an endless form and passing a delivery position near said mounting position and capable of making a stop at said delivery position; and an engine shifting conveyor having an engine shifting jig said engine shifting conveyor extending between said delivery position and said mounting position and being capable of making a reciprocating movement at a comparatively high speed between the delivery position and the mounting position; said engine shifting jig including a lifting means provided at its upper end with a slide plate and carried by said shifting conveyor, a mounting plate for mounting said engine and mounted on said slide plate with a rolling member interposed therebetween for movement in all horizontal directions on said slide plate within a limited region when said lifting means has been operated upwardly, and a locking means provided on said mounting plate and adapted to be brought into and out of engagement with said engine.

2. A conveyor system for use in an automobile assembly line according to claim 1 wherein said body-carrying tact conveyor runs at said engine mounting position in a direction substantially parallel to the running direction of said engine carrying conveyor at said delivery position, and said engine shifting conveyor extends so as to cross said body-carrying tact conveyor and said engine transferring conveyor substantially at right angles thereto at said engine mounting position and said delivery position, respectively.

* * * * *